United States Patent
Tadokoro et al.

(10) Patent No.: US 8,978,610 B2
(45) Date of Patent: Mar. 17, 2015

(54) VALVE TIMING CONTROL APPARATUS FOR INTERNAL COMBUSTION ENGINE

(71) Applicant: Hitachi Automotive Systems, Ltd., Hitachinaka-shi, Ibaraki (JP)

(72) Inventors: Ryo Tadokoro, Atsugi (JP); Shinichi Kawada, Isehara (JP); Atsushi Yamanaka, Atsugi (JP); Hiroyuki Nemoto, Hitachi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 14/172,279

(22) Filed: Feb. 4, 2014

(65) Prior Publication Data
US 2014/0216202 A1    Aug. 7, 2014

(30) Foreign Application Priority Data
Feb. 6, 2013    (JP) .................... 2013-020967

(51) Int. Cl.
*F01L 1/34*    (2006.01)
*F16H 25/10*    (2006.01)

(52) U.S. Cl.
CPC ..................... *F16H 25/10* (2013.01)
USPC ............ 123/90.17; 123/90.15; 464/160

(58) Field of Classification Search
USPC ................. 123/90.15, 90.17; 464/160
See application file for complete search history.

(56) References Cited

U.S. PATENT DOCUMENTS

| | | | |
|---|---|---|---|
| 7,603,223 B2 | 10/2009 | Moriya | |
| 7,603,975 B2 * | 10/2009 | Sugiura et al. | 123/90.17 |
| 2009/0048758 A1 | 2/2009 | Moriya | |

FOREIGN PATENT DOCUMENTS

JP    2006-207398 A    8/2006

* cited by examiner

*Primary Examiner* — Ching Chang
(74) *Attorney, Agent, or Firm* — Foley & Lardner LLP (57) ABSTRACT

A valve timing control apparatus for an internal combustion engine, including a drive rotation member, a follower rotation member, an electric motor serving to change a relative rotational phase of the drive rotation member and the follower rotation member, a torsion spring accommodated in an annular accommodation space having an axial closed end which is formed between an inner periphery of the drive rotation member and an outer periphery of the follower rotation member, and a stop plate fixed to the drive rotation member so as to cover a part of an axial open end of the annular accommodation space, the stop plate cooperating with the follower rotation member or a camshaft to restrict relative rotation of the drive rotation member and the follower rotation member within a predetermined angular range.

5 Claims, 4 Drawing Sheets

VALVE TIMING CONTROL APPARATUS FOR INTERNAL COMBUSTION ENGINE

BACKGROUND OF THE INVENTION

The present invention relates to a valve timing control apparatus for an internal combustion engine, and particularly relates to a valve Liming control apparatus that serves to control opening and closing timings of an exhaust valve.

Japanese Patent Application Unexamined Publication No. 2006-207398 A discloses a valve timing control apparatus for an internal combustion engine which includes a drive rotation member (sprocket) synchronously rotatable with a crankshaft, a follower rotation member disposed to be rotatable relative to the sprocket and make a unitary rotation with a camshaft, an electric motor connected to the follower rotation member through a given speed reducer. The valve timing control apparatus is adapted to change a rotational phase of the camshaft relative to the crankshaft by controlling operation of the electric motor in accordance with an operating condition of the engine.

An intake valve and an exhaust valve are provided with valve timings appropriate to engine start which are different from each other. Especially, the exhaust valve must be positioned on a phase-advance side at the time of engine start. Therefore, the valve timing control apparatus of the above conventional art includes a valve timing adjusting mechanism for an exhaust valve in which a biasing member is disposed between the drive rotation member and the follower rotation member. With the provision of the biasing member, the valve timing adjusting mechanism has a failsafe function to change a phase of the exhaust valve to the phase-advance side even when a malfunction of an electric system occurs.

SUMMARY OF THE INVENTION

However, in the valve timing control apparatus of the above conventional art, in a case where a torsion spring is used as the biasing member, it is likely that the torsion spring is fallen off as the biasing force is increased. Therefore, it is necessary to provide the valve timing control apparatus with a specific spring stop structure for preventing fall-off of the torsion spring. As a result, problems such as upsizing of the valve timing control apparatus and increased costs thereof are caused.

The present invention was made in view of such problems of the valve timing control apparatus of the above conventional art. It is an object of the present invention to provide a valve timing control apparatus for an internal combustion engine in which fall-off of a torsion spring can be suppressed without separately and additionally providing a structure for preventing the torsion spring from falling off.

In a first aspect of the present invention, there is provided a valve timing control apparatus for an internal combustion engine, the internal combustion engine including a crankshaft and a camshaft to drive an exhaust valve, the valve timing control apparatus being disposed on the camshaft, the valve timing control apparatus including:

a drive rotation member to which rotation of the crankshaft is transmitted;

a follower rotation member fixed to the camshaft;

an electric motor serving to change a relative rotational phase of the drive rotation member and the follower rotation member;

a torsion spring accommodated in an annular accommodation space having an axial closed end which is formed between an inner periphery of the drive rotation member and an outer periphery of the follower rotation member, the torsion spring having one end connected to the drive rotation member and the other end connected to the follower rotation member; and a stop plate fixed to the drive rotation member so as to cover a part of an axial open end of the annular accommodation space, the stop plate cooperating with the follower rotation member or the camshaft to restrict relative rotation of the drive rotation member and the follower rotation member within a predetermined angular range.

In a second aspect of the present invention, there is provided the valve timing control apparatus according to the first aspect of the present invention, wherein one of an inner periphery of the stop plate and the outer periphery of the follower rotation member includes an engaging projection, and the other of the inner periphery of the stop plate and the outer periphery of the follower rotation member includes an engaging recess that receives the engaging projection to allow relative rotation of the stop plate and the follower rotation member within a range in a circumferential direction of the other of the inner periphery of the stop plate and the outer periphery of the follower rotation member, the engaging projection and the engaging recess cooperating with each other to restrict the relative rotation of the drive rotation member and the follower rotation member within the predetermined angular range.

In a third aspect of the present invention, there is provided the valve timing control apparatus according to the first aspect of the present invention, wherein the stop plate is fixed to the drive rotation member by means of a bolt through which the drive rotation member and the electric motor are fastened to each other.

In a fourth aspect of the present invention, there is provided the valve timing control apparatus according to the third aspect of the present invention, wherein the drive rotation member includes an engaging groove formed in the inner periphery of the drive rotation member, the engaging groove extending from an axial open end of the drive rotation member along an axial direction of the drive rotation member, and wherein the one end of the torsion spring is retained in the engaging groove, and an open end of the engaging groove is covered by the stop plate.

In a fifth aspect of the present invention, there is provided a valve timing control apparatus for an internal combustion engine, the internal combustion engine including a crankshaft and a camshaft to drive an exhaust valve, the valve timing control apparatus being disposed on the camshaft, the valve timing control apparatus including:

a drive rotation member to which rotation of the crankshaft is transmitted;

a follower rotation member fixed to the camshaft;

an electric actuator serving to change a relative rotational phase of the drive rotation member and the follower rotation member;

a biasing member accommodated in an annular accommodation space having an axial closed end which is formed between an inner periphery of the drive rotation member and an outer periphery of the follower rotation member, the biasing member generating a biasing force between the drive rotation member and the follower rotation member; and a stop plate fixed to the drive rotation member so as to cover a part of an axial open end of the annular accommodation space, the stop plate serving to restrict relative rotation of the drive rotation member and the follower rotation member within a predetermined angular range.

According to the present invention, there is provided a valve timing control apparatus for an internal combustion engine in which fall-off of a torsion spring can be suppressed without separately and additionally providing a structure for preventing the torsion spring from falling off.

Other objects and features of this invention will become understood from the following description with reference to the accompanying drawings.

DETAILED DESCRIPTION OF THE INVENTION

With reference to the accompanying drawings, a valve timing control apparatus for an internal combustion engine according to an embodiment of the present invention which serves to control opening and closing timings of an exhaust valve is explained.

Figure 1:
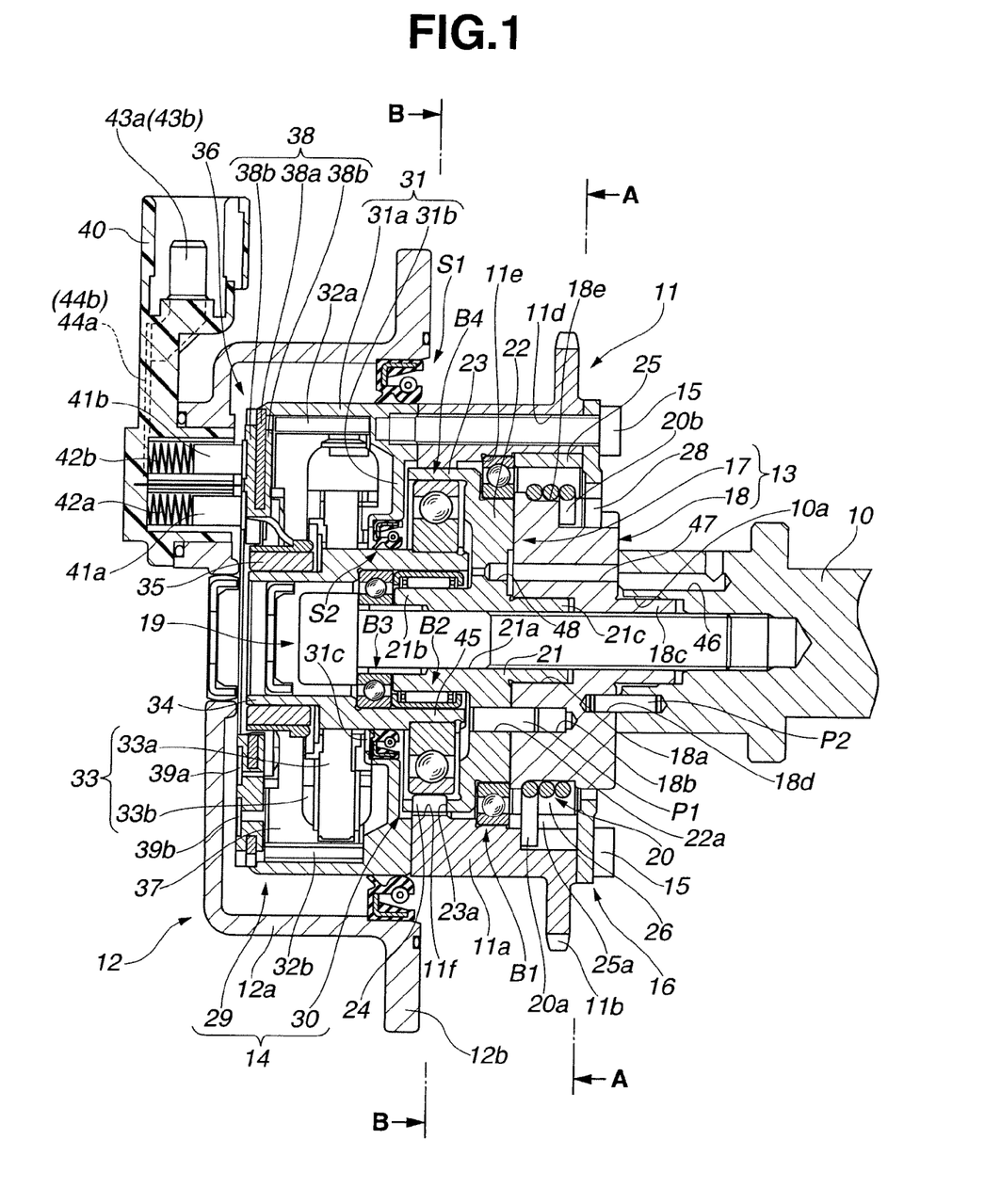
FIG. 1 is a vertical cross-section of a valve timing control apparatus according to an embodiment of the present invention.

As shown in FIG. 1, a valve timing control apparatus according to the embodiment includes generally cylindrical timing sprocket 11, cover member 12 disposed on a side of one axial end (distal end) of timing sprocket 11, follower 13 disposed to make a unitary rotation with camshaft 10, and phase change mechanism 14 accommodated within a space defined by cover member 12 and timing sprocket 11. Timing sprocket 11 serves as a drive rotation member that receives a rotational drive force from a crankshaft (not shown) of an internal combustion engine and synchronously rotates with the crankshaft. Cover member 12 is disposed on a side of a cylinder head (not shown). Camshaft 10 is rotatably supported on the cylinder head, and has one axial end exposed to an outside of the cylinder head. Follower 13 as a follower rotation member is fixed to the one axial end of camshaft 10. Phase change mechanism 14 is disposed between timing sprocket 11 and follower 13 to change a relative rotational phase of timing sprocket 11 and follower 13 in accordance with an operating condition of the engine.

Timing sprocket 11 is integrally formed of an iron-based metal, and includes tubular base portion 11a having a stepwise inner peripheral surface. An opening at one axial end of tubular base portion 11a is closed by electric motor 29, and an opening at the other axial end thereof is closed by annular stop plate 16. Gear portion 11b is integrally formed with an outer periphery of the other axial end portion of tubular base portion 11a, and receives the rotational drive force from the crankshaft through a timing chain (not shown) wound on gear portion 11b. Timing sprocket 11 is rotatably supported on shaft support member 17 disposed on an inner peripheral side of tubular base portion 11a, through first bearing (ball bearing) B1. Stop plate 16 is fixed to timing sprocket 11 by means of a plurality of bolts 15 through which timing sprocket 11 and electric motor 29 are fastened to each other.

Figure 2:
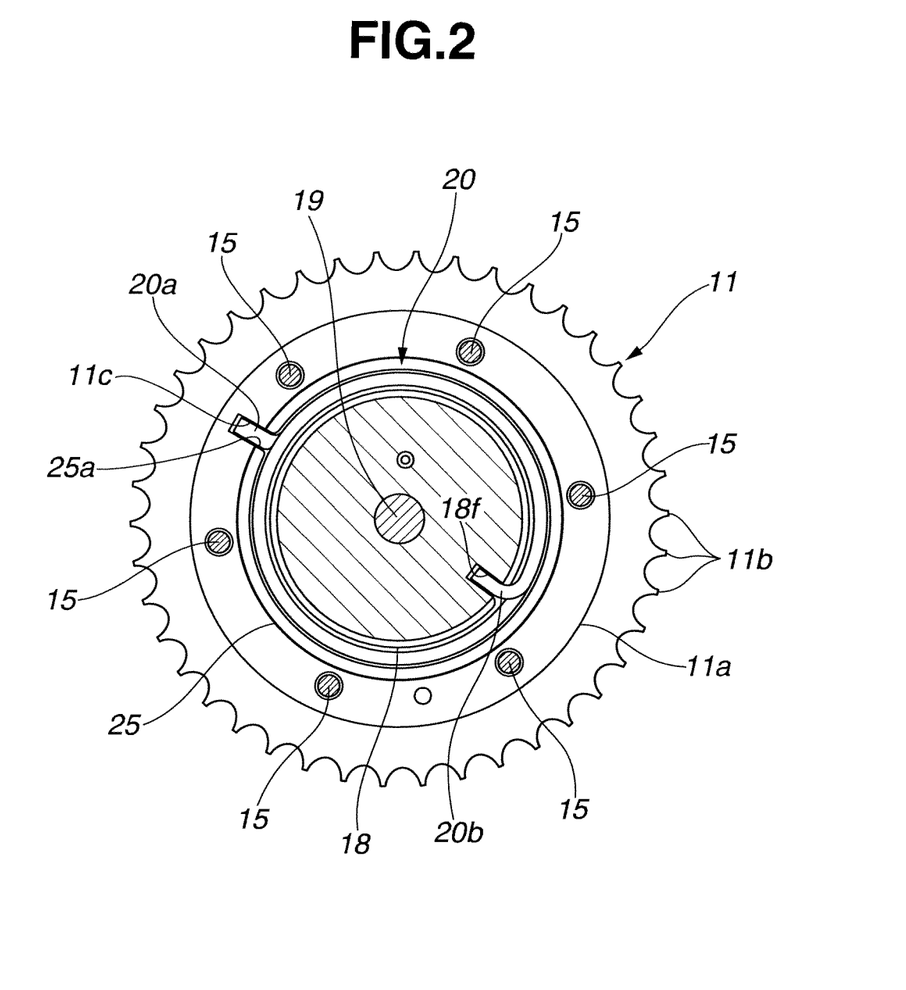
FIG. 2 is a cross-section of the valve timing control apparatus according to the embodiment of the present invention, taken along line A-A shown in FIG. 1.

As shown in FIG. 2, first spring-end engaging groove 11c is formed in the inner peripheral surface of the other axial end portion of tubular base portion 11a. First spring-end engaging groove 11c extends in a radially outward direction of tubular base portion 11a corresponding to a shape of one end portion 20a of torsion spring (biasing member) 20 disposed between tubular base portion 11a and follower 13. First spring-end engaging groove 11c also extends from the other axial open end of tubular base portion 11a along an axial direction of tubular base portion 11a. First spring-end engaging groove 11c is formed in a predetermined position in a circumferential direction of tubular base portion 11a in which first spring-end engaging groove 11c is prevented from interfering with bolt insertion holes 11d into which bolts 15 are inserted. One end portion 20a of torsion spring 20 is engaged and retained in first spring-end engaging groove 11c through groove 25a of collar member 25 disposed on the inner peripheral side of the other axial end portion of tubular base portion 11a.

Cover member 12 is made of a suitable material, for instance, an aluminum alloy and formed into a generally cup shape. Cover member 12 includes cylindrical bulged portion 12a bulged in an axial direction of cover member 12 so as to cover an outer periphery of electric motor 29. Flange portion 12b is disposed at an end of cover member 12 in the axial direction, and extends from an outer periphery of bulged portion 12a in a radially outward direction of bulged portion 12a. Cover member 12 is fixed to a side portion of the cylinder head through flange portion 12b by means of a plurality bolts (not shown). Annular seal member S1 is disposed between an inner peripheral surface of cover member 12 and an outer peripheral surface of electric motor 29. With the provision of seal member S1, electric motor 29 can be prevented from suffering entry of water and dust from an outside of electric motor 29 thereinto through a fine clearance between an inner peripheral surface of flange portion 12b and a side surface of the cylinder head.

Follower 13 includes shaft support member 17 serving to support output shaft member 34 that is connected to electric motor 29 (specifically armature 33), and spring retainer member 18 disposed between shaft support member 17 and the one axial end of camshaft 10 to serve to retain torsion spring 20. Shaft support member 17 and spring retainer member 18 are fastened to the one axial end of camshaft 10 through cam bolt 19 in a juxtaposed relation to each other in an axial direction of cam bolt 19.

As shown in FIG. 1, torsion spring 20 is accommodated in annular accommodation space 26 having one axial closed end which is formed between timing sprocket 11 and follower 13. The one axial closed end of annular accommodation space 26 is located on a side of shaft support member 17 of follower 13, and the other axial open end of annular accommodation space 26 is located on a side of spring retainer member 18. As shown in FIG. 2, one end portion 20a of torsion spring 20 is fixed to timing sprocket 11, and the other end portion 20b thereof is fixed to spring retainer member 18. Torsion spring 20 serves to bias spring retainer member 18 toward a phase-advance side. With the arrangement of provision of torsion spring 20, in a case where the engine is stopped when a malfunction of the electric system occurs in which input of phase change torque from phase change mechanism 14 (electric motor 29) is disturbed, follower 13 can be biased toward the phase-advance side against a so-called alternating torque corresponding to a rotational force in a phase-retard direction which is transmitted to follower 13 through camshaft 10.

Shaft support member 17 includes tubular base portion 21, disk portion 22 and roller retaining portion 23 which are formed integrally with shaft support member 17. Tubular base portion 21 is disposed in a radially central position of shaft support member 17. Disk portion 22 is disposed in an axially intermediate position of tubular base portion 21, and extends in a radially outward direction of tubular base portion 21. Roller retaining portion 23 is disposed on an outer periphery of disk portion 22 on a side of an axial end of disk portion 22 (i.e., on a side of electric motor 29), and extends in a radially outward direction of disk portion 22 and toward the side of electric motor 29 in an axial direction of disk portion 22. A plurality of rollers 24 are retained in a spaced relation to each other in a circumferential direction of disk portion 22 by roller retaining portion 23. Axial end portion (the other end portion as explained later) 21c of tubular base portion 21 which is located on a side of camshaft 10 is fitted to cylindrical concave portion 18a formed in spring retainer member 18. With the fitting engagement between axial end portion 21c and concave portion 18a, a coaxial relation between shaft support member 17 and spring retainer member 18 can be ensured. Shaft support member 17 is fixed to camshaft 10 through cam bolt 19 in such a state that shaft support member 17 is held in a given rotational position relative to spring retainer member 18 by means of a plurality of first positioning pins P1.

Tubular base portion 21 has cam bolt insertion hole 21a extending through a central portion of tubular base portion 21 in an axial direction of tubular base portion 21. Cam bolt 19 extends through cam bolt insertion hole 21a into cam shaft 10. Tubular base portion 21 has one axial end portion 21b (an axial end portion on the side of electric motor 29) onto which second bearing (needle bearing) B2 is fitted. On the other hand, the other axial end portion (the axial end portion on the side of camshaft 10) 21c of tubular base portion 21 is provided in the form of a projection fitted to concave portion 18a of spring retainer member 18. Third bearing (ball bearing) B3 is disposed adjacent to one axial end portion 21b of tubular base portion 21 in the axial direction of tubular base portion 21. Third bearing B3 serves to rotationally support output shaft member 34 of electric motor 29. An inner ring of third bearing B3 is interposed between a tip end of one axial end portion 21b of tubular base portion 21 and a head of cam bolt 19.

Disk portion 22 has a plurality of pin insertion holes (through holes) 22a each being formed in a predetermined position in the circumferential direction of disk portion 22. One end portion of each of first positioning pins P1 is inserted into each of pin insertion holes 22a. Disk portion 22 also has oil hole 48 through which a lubricating oil is supplied to second bearing B2, third bearing 53 and fourth bearing B4 as explained later. Oil hole 48 is formed in a predetermined position in the circumferential direction of disk portion 22 which differs from the predetermined position of each of pin insertion holes 22a. First bearing B1 is fitted onto an outer peripheral surface of disk portion 22, through which timing sprocket 11 is rotatably supported.

An inner ring of first bearing B1 is fixedly interposed between roller retaining portion 23 of shaft support member 17 and spring retainer member 18 in an axial direction of first bearing B1. An outer ring of first bearing B1 is fixedly interposed between inner peripheral-side step portion 11e of timing sprocket 11 and collar member 25 disposed on an outer peripheral side of spring retainer member 18 in an opposed relation to step portion 11e in the axial direction of first bearing B1. Collar member 25 has groove (cutout) 25a extending from an axial end surface of collar member 25 which is opposed to stop plate 16, in an axial direction of collar member 25. As shown in FIG. 2, groove 25a is formed in a circumferential position of collar member 25 in which groove 25a is opposed to first spring-end engaging groove 11e of tubular base portion 11a of timing sprocket 11 in a radial direction of collar member 25. One end portion 20a of torsion spring 20 is exposed to a radial outside of collar member 25 through groove 25a and fitted into first spring-end engaging groove 11c.

Roller retaining portion 23 of shaft support member 17 has a generally tubular shape, and has a plurality of roller retaining holes (through holes) 23a formed in predetermined circumferential positions of roller retaining portion 23. Each of rollers 24 is accommodated in each of roller retaining holes 23a and rotatably retained therein.

Spring retainer member 18 has a generally cylindrical shape, and has cylindrical concave portion 18a on one axial end surface thereof located on a side of shaft support member 17 and cylindrical projection 18c on the other axial end surface thereof located on a side of camshaft 10. Cylindrical concave portion 18a is formed in a central portion of the one axial end surface of spring retainer member 18, into which the other axial end portion 21c of tubular base portion 21 is fitted. A plurality of first positioning holes 18b are formed on an outer peripheral side of cylindrical concave portion 18a in the one axial end surface of spring retainer member 18. An opposite end portion of each of first positioning pins P1 is inserted into each of first positioning holes 18b. Cylindrical projection 18c is fitted to cylindrical concave portion 10a formed in camshaft 10. A plurality of second positioning holes 18d are formed on an outer peripheral side of cylindrical projection 18c in the other axial end surface of spring retainer member 18. One end portion of each of a plurality of second positioning pins P2 is inserted into each of second positioning holes 18d. Second positioning pins P2 serve for positioning of spring retainer member 18 relative to camshaft 10 in a rotational direction of spring retainer member 18. With the fitting engagement between projection 18c and concave portion 10a, a coaxial relation between spring retainer member 18 and camshaft 10 can be ensured. Further, with the connection between spring retainer member 18 and camshaft 10 through second positioning pins P2, the positioning of spring retainer member 18 in the rotational direction can be performed. In such a condition, spring retainer member 18 is fixedly interposed between shaft support member 17 and camshaft 10 through cam bolt 19.

In addition, spring retainer member 18 has annular groove 18e into which torsion spring 20 is fitted. Annular groove 18e is formed in an outer peripheral surface of a portion of spring retainer member 18 which is located on a side of the one axial end of spring retainer member 18. Annular groove 18e extends along a circumferential direction of spring retainer member 18. Annular groove 18e also extends along an axial direction of spring retainer member 18, and stably retains torsion spring 20 between axial ends thereof opposed to each other in the axial direction. As shown in FIG. 1 and FIG. 2, the other end portion 20b of torsion spring 20 is engaged in second spring-end engaging groove 18f formed in the other axial end portion of spring retainer member 18. Second spring-end engaging groove 18f extends from the outer peripheral surface of spring retainer member 18 in a radially inward direction of spring retainer member 18 corresponding to a shape of the other end portion 20b of torsion spring 20.

Upon fitting torsion spring 20 into annular groove 18e of spring retainer member 18, torsion spring 20 is inserted into annular accommodation space 26 between timing sprocket 11 and spring retainer member 18 from a side of the axial open end of annular accommodation space 26 (that is, from a side of the other axial end of spring retainer member 18) in such a way that one end portion 20a of torsion spring 20 is engaged in first spring-end engaging groove 11c of timing sprocket 11 and the other end portion 20b of torsion spring 20 is engaged in second spring-end engaging groove 18f of spring retainer member 18. The axial open end of annular accommodation space 26 is partially covered with stop plate 16.

Figure 3:
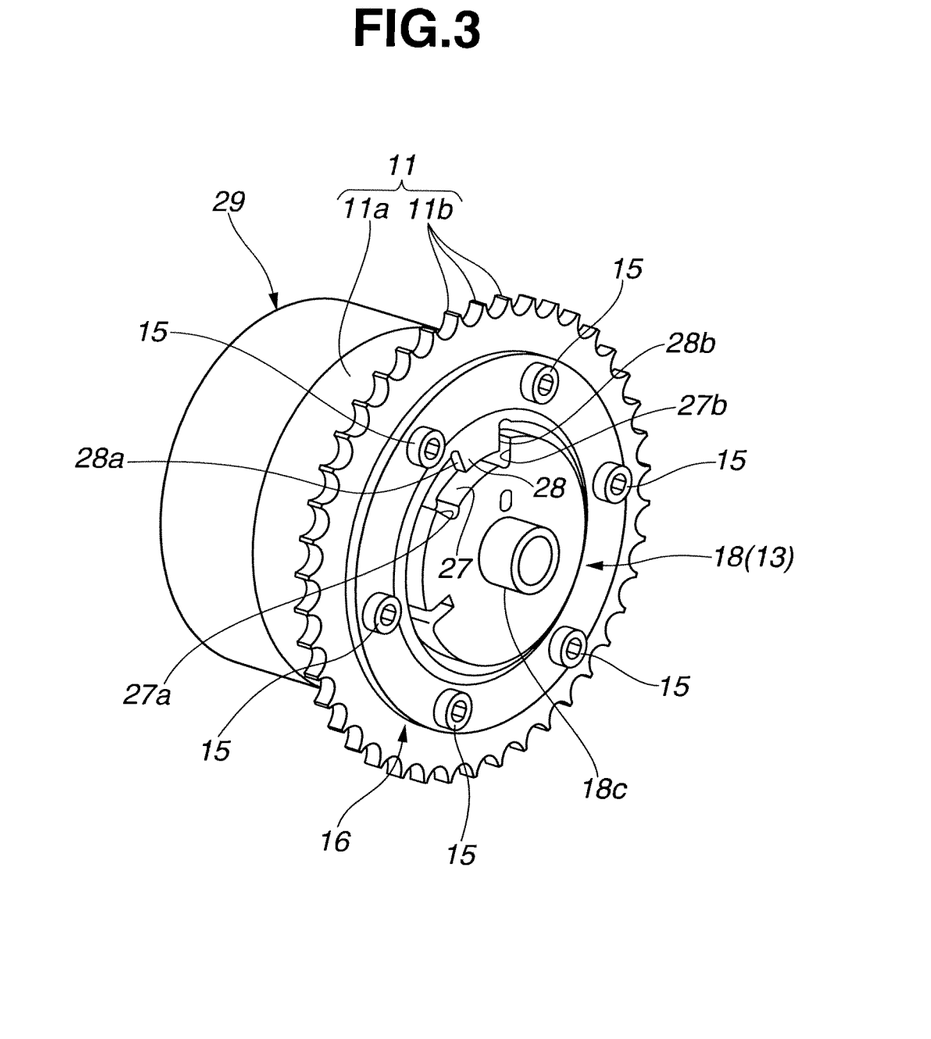
FIG. 3 is a perspective view of the valve timing control apparatus of the embodiment of the present invention in which a cover member is removed, as viewed from a camshaft mounting side.

Further, as shown in FIG. 1 and FIG. 3, spring retainer member 18 has relative rotation restriction recess (engaging recess) 27 in which relative rotation restriction projection (engaging projection) 28 of stop plate 16 is received. Relative rotation restriction recess 27 is formed in an outer periphery of the other axial end portion of spring retainer member 18. Relative rotation restriction recess 27 is provided in the form of an arcuate cutout portion extending over a predetermined circumferential range of spring retainer member 18 and being opened to the other axial end surface of spring retainer member 18. On the other hand, relative rotation restriction projection 28 is formed on an inner periphery of stop plate 16. Relative rotation restriction projection 28 extends in a radially inward direction of stop plate 16 over a predetermined circumferential range of stop plate 16 which is smaller than the predetermined circumferential range of relative rotation restriction recess 27 such that relative rotation restriction projection 28 can be moved in relative rotation restriction recess 27. Opposite side surfaces 28a, 28b of relative rotation restriction projection 28 which are located in the circumferential direction of stop plate 16 can be brought into contact with the corresponding side surfaces 27a, 27b of relative rotation restriction recess 27 which are opposed to side surfaces 28a, 28b, respectively. Owing to the contact of side surfaces 28a, 28b and side surfaces 27a, 27b, relative rotation of spring retainer member 18 and stop plate 16 can be restricted. In other words, relative rotation of stop plate 16 and spring retainer member 18 (follower 13), i.e., relative rotation of timing sprocket 11 and camshaft 10, is allowed only within the predetermined range of relative rotation restriction recess 27 in the circumferential direction of spring retainer member 18. That is, relative rotation restriction recess 27 and relative rotation restriction projection 28 cooperate with each other to restrict relative rotation of timing sprocket 11 and follower 13 within a predetermined angular range.

As shown in FIG. 1, phase change mechanism 14 is arranged in axial alignment with camshaft 10, between which follower 13 is disposed. Phase change mechanism 14 includes electric motor 29 and speed reduction mechanism 30 disposed between electric motor 29 and shaft support member 17 of follower 13. Electric motor 29 is an electric actuator that is rotationally driven by a control current produced by an electronic control unit (not shown), and serves to generate phase change torque. Speed reduction mechanism 30 serves to reduce rotational speed outputted from electric motor 29 and transmit the rotational speed reduced. The electronic control unit is configured to drive and control operation of electric motor 29 in accordance with an operating condition of the engine which is determined on the basis of signals outputted from various sensors (not shown) such as a crank angle sensor, an air flow meter, an engine coolant temperature sensor, a throttle sensor, etc.

Electric motor 29 is provided in the form of a DC motor equipped with first and second brushes 41a, 41b. Electric motor 29 includes cylindrical yoke 31 having one open end, a pair of semi-cylindrical permanent magnet pieces 32a, 32b as a stator which are fixed on an inner peripheral surface of yoke 31, armature 33 as a rotor which is rotatably disposed on an inner peripheral side of permanent magnet pieces 32a, 32b. Yoke 31 is fixed to timing sprocket 1 through the plurality of bolts 15 and makes a unitary rotation with timing sprocket 11. Electric motor 29 also includes output shaft member 34 disposed on an inner peripheral side of armature 33 so as to make a unitary rotation with armature 33 to serve for an output of armature 33, commutator 35 disposed on an outer periphery of one axial end portion of output shaft member 34 which is located on a side of the one open end of yoke 31, and power supply portion 36 serving for supplying electrical power to armature 33 (coil 33b) through commutator 35. Power supply portion 36 is disposed to close the one open end of yoke 31.

Yoke 31 includes cylindrical side wall portion 31a having substantially the same outer diameter as that of tubular base portion 11a of timing sprocket 1, and bottom wall portion 31b connected with cylindrical side wall portion 31a to be opposed to tubular base portion 11a of timing sprocket 11 in an axial direction of yoke 31. Yoke 31 is disposed adjacent to timing sprocket 11 in series in the axial direction thereof such that bottom wall portion 31b closes the one open end of timing sprocket 11. Yoke 31 is fastened to timing sprocket 11 and stop plate 16 by means of the plurality of bolts 15 extending through timing sprocket 11. One open end of cylindrical side wall portion 31a is sealed with sealing plate 38 of power supply portion 36.

Bottom wall portion 31b has shaft insertion hole 31c at an approximately central portion thereof. Shaft insertion hole 31c penetrates bottom wall portion 31b, through which output shaft member 34 extends. The other axial end portion of output shaft member 34 which is opposed to follower 13 is connected to speed reduction mechanism 30. Second seal member S2 is disposed on a peripheral edge of shaft insertion hole 31c on the side of speed reduction mechanism 30, and serves for fluid-tight sealing of motor accommodating space 37 formed on an inner peripheral side of yoke 31. With the provision of second seal member S2, inflow of lubricating oil from a side of speed reduction mechanism 30 into motor accommodating space 37 can be prevented.

Armature 33 includes rotor 33a that is an iron core disposed on an outer periphery of an axial middle portion of output shaft member 34, and a plurality of coils 33b wound around rotor 33a. Coils 33b are electrically connected with power supply portion 36 through commutator 35, so that armature 33 can be supplied with electric current.

The other axial end portion of output shaft member 34 is supported on a side of armature 33 by cam bolt 19 through third bearing B3, and supported on a side of follower 13 by shaft support member 17 through second bearing B2. The other axial end portion of output shaft member 34 is formed as eccentric shaft portion 45 that has a central axis offset from a central axis of the remaining portion of output shaft member 34. Eccentric shaft portion 45 constitutes a part of speed reduction mechanism 30.

Power supply portion 36 includes sealing plate 38 disposed to close the one open end of yoke 31, a pair of slip rings 39a, 39b disposed on one side surface of sealing plate 38, and case 40 having a generally L-shaped vertical section which is fitted into bulged portion 12a of cover member 12 such that one end portion (a base end portion) of case 40 in a longitudinal direction thereof is opposed to a part of the one side surface of sealing plate 38, i.e., partially opposed to slip rings 39a, 39b, in a circumferential direction of sealing plate 38. Sealing plate 38 includes generally disk-shaped core 38a made of a metal material, and resin insulators 38b respectively disposed on opposite side surfaces of core 38a. Slip rings 39a, 39b are disposed on a radial inside of the one side surface of sealing plate 38 and a radial outside thereof, respectively. Power supply portion 36 also includes a pair of brushes 41a, 41b and a pair of springs 42a, 42b which are disposed on an inner peripheral side of the base end portion of case 40, a pair of connecting terminals 43a, 43b disposed within the other end portion of case 40, and a pair of harnesses 44a, 44b through which connecting terminals 43a, 43b and brushes 41a, 41b are connected with each other. Brushes 41a, 41b are partially opposed to slip rings 39a, 39b in a circumferential direction of slip rings 39a, 39b, respectively. Springs 42a, 42b bias brushes 41a, 41b toward one side surfaces of slip rings 39a, 39b, respectively. Connecting terminals 43a, 43b are connected to an on-board battery (not shown).

Figure 4:
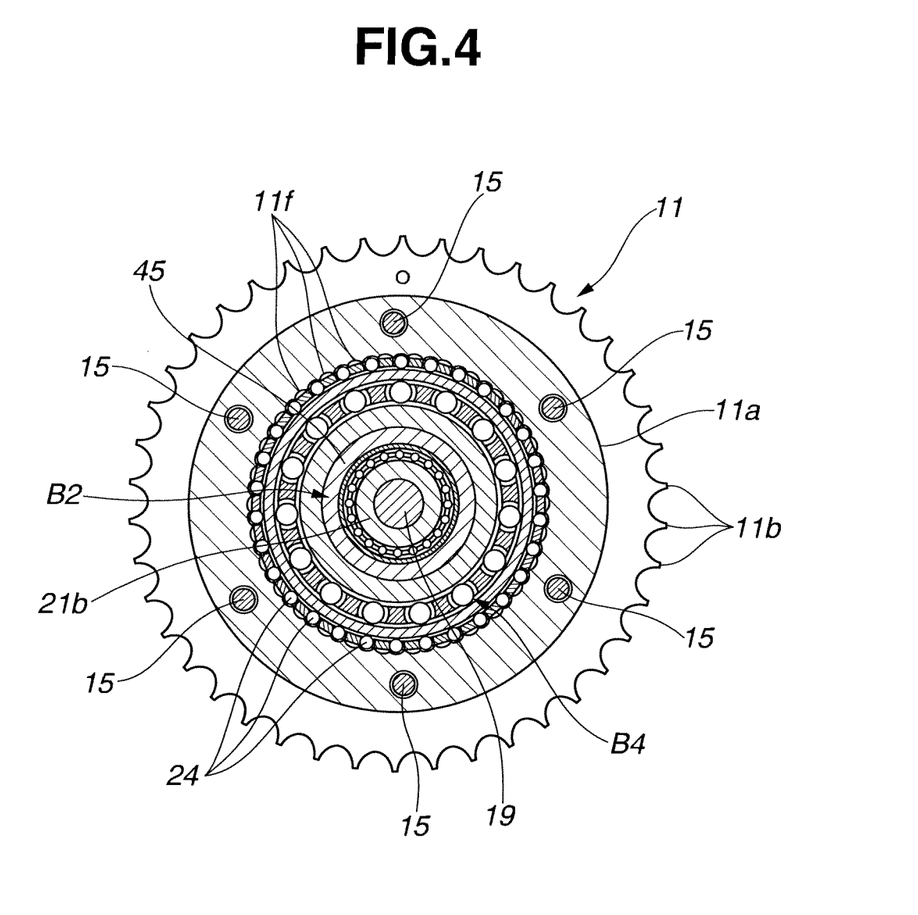
FIG. 4 is a cross-section of the valve timing control apparatus of the embodiment of the present invention, taken along line B-B shown in FIG. 1.

As shown in FIG. 1 and FIG. 4, speed reduction mechanism 30 includes eccentric shaft portion 45 formed on the other axial end portion of output shaft member 34 of electric motor 29, fourth bearing B4 disposed on an outer periphery of eccentric shaft portion 45, rollers 24 rotatably supported on an outer periphery of fourth bearing B4, and roller retaining portion 23 of shaft support member 17. Eccentric shaft portion 45 is configured to be eccentrically rotatable about the central axis of output shaft member 34 in accordance with rotation of output shaft member 34. Fourth bearing B4 is a ball bearing having a relatively large diameter. Roller retaining portion 23 is configured to retain rollers 24 in a rotational direction thereof and permit an axial displacement of rollers 24, thereby serving as a cage for rollers 24.

Fourth bearing B4 and rollers 24 are arranged in a radial direction thereof and aligned with each other over an approximately whole axial length thereof. An inner ring of fourth bearing B4 is press-fitted onto an outer peripheral surface of eccentric shaft portion 45. An outer ring of fourth bearing B4 is always kept in contact with rollers 24 on an outer peripheral surface thereof. A plurality of grooves 11f are formed in an inner periphery of timing sprocket 11 (tubular base portion 11a) which is opposed to the outer peripheral surface of the outer ring of fourth bearing B4, over an entire circumferential region of the inner periphery. Each of grooves 11f has an arcuate shape in section, and extends in an axial direction of timing sprocket 11. Grooves 11f constitute internal teeth meshing rollers 24.

An annular radial clearance is formed between grooves 11f and the outer peripheral surface of the outer ring of fourth bearing B4. The radial clearance is not smaller than a diameter of each of rollers 24. With the provision of the radial clearance, fourth bearing B4 can be eccentrically moved in accordance with eccentric rotation of eccentric shaft portion 45. As fourth bearing B4 is eccentrically moved, rollers 24 can be moved in a radial direction thereof so that some of rollers 24 are engaged in grooves 11f. As a result, a rotational drive force of timing sprocket 11 is transmitted to shaft support member 17 (follower 13).

Specifically, grooves 11f are formed such that a meshing position in which each of rollers 24 is engaged in each of grooves 11f is displaced by one tooth per one rotation of eccentric shaft portion 45. With this construction, rotation number of electric motor 29 is reduced. The reduced rotation number of electric motor 29 is transmitted to follower 13 so that follower 13 is rotated relative to timing sprocket 11.

Further, speed reduction mechanism 30 includes a lubricating oil supply mechanism for supplying a lubricating oil to speed reduction mechanism 30. As shown in FIG. 1, the lubricating oil supply mechanism includes introduction passage 46 formed in camshaft 10 along an axial direction of camshaft 10, connecting passage 47 penetrating spring retainer member 18 in an axial direction of spring retainer member 18, and oil hole 48 penetrating disk portion 22 of shaft support member 17. Introduction passage 46 serves to introduce the lubricating oil from a main oil gallery (not shown) through an inside oil passage (not shown) of the cylinder head. Connecting passage 47 through which introduction passage 46 is connected with oil hole 48. Oil hole 48 has one end connected to connecting passage 47 and the other end opened to a bearing portion constituted of second bearing B2 and fourth bearing B4. The lubricating oil supply mechanism serves to lubricate second and fourth bearings B2, B4 of speed reduction mechanism 30 by introducing the lubricating oil from the main oil gallery.

In the following, an operation and effects of the valve timing control apparatus for an internal combustion engine according to the embodiment of the present invention are explained by referring to FIG. 1.

At the time of starting of the engine, the crankshaft is rotationally driven by a starter motor (not shown) so that timing sprocket 11 is rotated through the timing chain. Electric motor 29 is synchronously rotated by the rotational force of timing sprocket 11 which is transmitted to electric motor 29 through yoke 31. The rotational force of timing sprocket 11 is also transmitted to camshaft 10 through speed reduction mechanism 30 and follower 13 associated with speed reduction mechanism 30. Camshaft 10 with cams is rotated to open and close an exhaust valve (not shown).

Subsequently, during an engine operation after the starting of the engine, electric motor 29 is rotationally driven on the basis of a control signal outputted from the electronic control unit. A rotational force of electric motor 29 is transmitted to camshaft 10 through speed reduction mechanism 30, so that camshaft 10 is rotated relative to timing sprocket 11 in a normal direction or a reverse direction to thereby change a relative rotational phase of camshaft 10 and timing sprocket 11. As a result, opening and closing timings (valve timing) of the exhaust valve can be changed to desired timings.

At the time of stopping of the engine, in a case where an electric system is in a normal condition, follower 13 is rotated to a phase-advance position relative to timing sprocket 11 in response to a control signal from the electronic control unit. On the other hand, in a case where the electric system is in a defective condition, follower 13 tends to rotate toward a phase-retard position relative to timing sprocket 11 in accordance with an alternating torque applied to camshaft 10. However, a biasing force of torsion spring 20 acts on follower 13 against the alternating torque, thereby holding follower 13 in the phase-advance position similarly to the case of the normal condition of the electric system.

In the valve timing control apparatus according to the embodiment of the present invention, one end portion 20a of torsion spring 20 is engaged in first spring-end engaging groove 11c of timing sprocket 11, and the other end portion 20b of torsion spring 20 is engaged in second spring-end engaging groove 18f of spring retainer member 18. With this construction, even in a case where a force is exerted on torsion spring 20 such that torsion spring 20 is inclined relative to a central axis thereof, torsion spring 20 can be prevented from inclining toward the one axial end of timing sprocket 11 (toward the side of speed reduction mechanism 30) by a bottom wall of each of spring-end engaging grooves 11c, 18f which extends in the radial direction of each of timing sprocket 11 (tubular base portion 11a) and spring retainer member 18, and can be prevented from inclining toward the other axial end of timing sprocket 11 (toward the side of camshaft 10) by stop plate 16. As a result, it is possible to suppress inclination of torsion spring 20 with respect to the central axis thereof and fall-off of torsion spring 20 from accommodation space 26 through the axial open end of accommodation space 26.

As described above, in the valve timing control apparatus according to the embodiment of the present invention, torsion spring 20 can be prevented from falling off from accommodation space 26 by stop plate 16 that is an existing part serving to restrict an amount of relative rotation of timing sprocket 11 and follower 13, without being provided with a separate part for restraining fall-off of torsion spring 20. As a result, as compared to the case where a specific part for restraining fall-off of a torsion spring is separately provided, it is possible to reduce the number of parts, and therefore, enhance an efficiency of an assembly work of the valve timing control apparatus, reduce a cost thereof and avoid upsizing thereof due to the provision of the specific restraining part.

Further, in the valve timing control apparatus according to the embodiment of the present invention, stop plate 16 is mounted to timing sprocket 11 by means of bolt 15 that is used for coupling timing sprocket 11 and electric motor 29 (yoke 31) to each other. The coupling structure using bolt 15 is an existing construction, and therefore, it is not necessary to provide a separate part for mounting stop plate 16, thereby enhancing the productivity and reduction of the cost.

The present invention is not particularly limited to the above embodiment. It is possible to modify a specific construction of a part or a mechanism, such as electric motor 29 and speed reduction mechanism 30, as long as they have no adverse influence on the operation and effects of the valve timing control apparatus of the present invention, in accordance with a specification of a valve timing control apparatus or an object to be equipped with the part or the mechanism.

This application is based on a prior Japanese Patent Application No. 2013-20967 filed on Feb. 6, 2013. The entire contents of the Japanese Patent Application No. 2013-20967 are hereby incorporated by reference.

Although the invention has been described above by reference to a certain embodiment of the invention, the invention is not limited to the embodiment described above. Further variations of the embodiment described above will occur to those skilled in the art in light of the above teachings. The scope of the invention is defined with reference to the following claims.

What is claimed is:

1. A valve timing control apparatus for an internal combustion engine, the internal combustion engine including a crankshaft and a camshaft to drive an exhaust valve, the valve timing control apparatus being disposed on the camshaft, the valve timing control apparatus comprising:
   a drive rotation member to which rotation of the crankshaft is transmitted;
   a follower rotation member fixed to the camshaft;
   an electric motor serving to change a relative rotational phase of the drive rotation member and the follower rotation member;
   a torsion spring accommodated in an annular accommodation space having an axial closed end which is formed between an inner periphery of the drive rotation member and an outer periphery of the follower rotation member, the torsion spring having one end connected to the drive rotation member and the other end connected to the follower rotation member; and
   a stop plate fixed to the drive rotation member so as to cover a part of an axial open end of the annular accommodation space, the stop plate cooperating with the follower rotation member or the camshaft to restrict relative rotation of the drive rotation member and the follower rotation member within a predetermined angular range.

2. The valve timing control apparatus as claimed in claim 1, wherein one of an inner periphery of the stop plate and the outer periphery of the follower rotation member comprises an engaging projection, and the other of the inner periphery of the stop plate and the outer periphery of the follower rotation member comprises an engaging recess that receives the engaging projection to allow relative rotation of the stop plate and the follower rotation member within a range in a circumferential direction of the other of the inner periphery of the stop plate and the outer periphery of the follower rotation member, the engaging projection and the engaging recess cooperating with each other to restrict the relative rotation of the drive rotation member and the follower rotation member within the predetermined angular range.

3. The valve timing control apparatus as claimed in claim 1, wherein the stop plate is fixed to the drive rotation member by means of a bolt through which the drive rotation member and the electric motor are fastened to each other.

4. The valve timing control apparatus as claimed in claim 3, wherein the drive rotation member comprises an engaging groove formed in the inner periphery of the drive rotation member, the engaging groove extending from an axial open end of the drive rotation member along an axial direction of the drive rotation member, and wherein the one end of the torsion spring is retained in the engaging groove, and an open end of the engaging groove is covered by the stop plate.

5. A valve timing control apparatus for an internal combustion engine, the internal combustion engine including a crankshaft and a camshaft to drive an exhaust valve, the valve timing control apparatus being disposed on the camshaft, the valve timing control apparatus comprising:
   a drive rotation member to which rotation of the crankshaft is transmitted;
   a follower rotation member fixed to the camshaft;
   an electric actuator serving to change a relative rotational phase of the drive rotation member and the follower rotation member;
   a biasing member accommodated in an annular accommodation space having an axial closed end which is formed between an inner periphery of the drive rotation member and an outer periphery of the follower rotation member, the biasing member generating a biasing force between the drive rotation member and the follower rotation member; and
   a stop plate fixed to the drive rotation member so as to cover a part of an axial open end of the annular accommodation space, the stop plate serving to restrict relative rotation of the drive rotation member and the follower rotation member within a predetermined angular range.

\* \* \* \* \*